United States Patent [19]
Hidaka

[11] Patent Number: 5,937,815
[45] Date of Patent: Aug. 17, 1999

[54] AIR INTAKE SYSTEM FOR INTERNAL COMBUSTION ENGINE

[75] Inventor: Yoshiaki Hidaka, Fujinomiya, Japan

[73] Assignee: Hidaka Engineering Co., Ltd., Fujinomiya, Japan

[21] Appl. No.: 09/042,571

[22] Filed: Mar. 17, 1998

[30] Foreign Application Priority Data

Mar. 28, 1997 [JP] Japan .................................. 9-094860

[51] Int. Cl.$^6$ .................................................. F02B 29/00
[52] U.S. Cl. ......................................................... 123/184.56
[58] Field of Search ........................ 123/184.56, 184.53, 123/184.55

[56] References Cited

U.S. PATENT DOCUMENTS 4,862,840  9/1989  Matsunaga et al. ............... 123/184.56
4,907,547  3/1990  Daly ................................... 123/184.53
4,911,111  3/1990  Matsunaga ......................... 123/184.56

*Primary Examiner*—Marguerite McMahon
*Attorney, Agent, or Firm*—Oblon, Spivak, McClelland, Maier & Neustadt, P.C.

[57] ABSTRACT

In an air intake system (14) for internal combustion engines in which combustion air is led into a cylinder via an air inlet path, the air inlet path comprises a double structure of a main inlet path (7a) and a sub inlet path (8a) that the sub inlet path (8a) is placed in the main inlet path (7a) so as to be in close contact with a bottom wall of the main inlet path (7a), a downstream end of the sub inlet path (8a) being positioned near an inlet valve opening (10e) on its one side other than an exhaust valve opening (10d) side; and that an opening/closing valve (9) is disposed within the sub inlet path (8a), wherein the opening/closing valve (9) is closed in a low intake-air amount operating region of the engine so as to allow intake air to be biased from the main inlet path (7a) toward a center of the cylinder and to flow into the cylinder along a cylinder axis.

6 Claims, 6 Drawing Sheets

AIR INTAKE SYSTEM FOR INTERNAL COMBUSTION ENGINE

BACKGROUND OF THE INVENTION

The present invention relates to an air intake system for internal combustion engines, in which the intake air amount can be increased over a wider operating range by making use of the dynamic effect of an intake air column, and in which a successful combustion state can be obtained by generating longitudinal vortices (tumbles) that flow axially of the cylinder even in low-intake operating regions where the amount of intake air is small.

Conventionally, the so-called inertia supercharging method in which the intake air amount is increased by making use of the dynamic effect of an intake air column has been adopted in the reciprocating internal-combustion engine from the viewpoint of output enhancement.

In this inertia supercharging, the relationship among pipe length l, pipe cross-sectional area A and an engine speed N at which inertia supercharging can be obtained can approximately be expressed by the following Helmholtz resonator vibration equation:

$$N_{rpm} = K \cdot aA \cdot /l \cdot V_m$$

where $V_m$ is the cylinder internal effective volume, a is the acoustic velocity and K is the proportional constant. From this equation, it can be easily understood that the inertia supercharging can be achieved by setting the pipe cross-sectional area A or the pipe length k to a value corresponding to the engine speed.

On the other hand, the variable-speed engine, particularly automobile engine, varies in working engine speed over a wide range from idle state to maximum engine speed. Therefore, in automobile engines employing the conventional inertia supercharging, the so-called tuning point at which the intake air amount is increased by inertia supercharging is set to around the engine speed with which the maximum torque or maximum output is generated. As a result, this type of conventional engine has been such that increase in torque or output could not be expected in regions other than the tuning point as a matter of course.

This being the case, as an air intake system capable of obtaining the inertia supercharging effect in a plurality of engine speed regions, there has conventionally been developed a system in which, for example, two air inlet pipes are arrayed in parallel, one inlet pipe being equipped with an opening/closing valve which is opened and closed responsive to the engine speed.

In this air intake system, because the inlet pipe cross-sectional area can be switched between two levels responsive to the engine speed, higher torque can be attained in both high- and low-speed regions.

Also for improvement in the combustion state of engines, it is known that generating longitudinal vortices, i.e. so-called tumbles that the intake air flows along the cylinder axis within the cylinder is effective. A conventionally known structure for generating these tumbles is, for example, one in which the cross section of the air intake path is shaped into a generally inverted triangle.

However, in the conventional system in which a plurality of systems of air intake paths are arranged in parallel, there is a problem that a large space is required in proportion to the parallel arrangement of a plurality of air inlet pipes. In particular, for a multiple cylinder engine, which is limited in intervals between the cylinders, it is difficult to actualize the arrangement of a plurality of systems as described above, while its structure tends to become complex.

Also, for the conventional system in which the cross section of the air intake path is shaped into a generally inverted triangle, it is difficult, as it stands, to reliably generate the tumbles because of low intake air flow rate in low-intake operating regions of small intake air amount, such as low-engine-speed, low-load operating regions. With an arrangement that the vertex of the inverted triangle is made smaller for reliable generation of tumbles even in the low-intake operating regions, conversely, there would arise a problem that the amount of air intake at high engine speed becomes insufficient to obtain high output.

An object of the present invention is to provide an air intake system for internal combustion engines, which solves the foregoing problems, and which is capable of actualizing the switching of the tuning point between two levels almost without causing any increase in the installation space, capable of increasing the intake air amount over a wide range of engine speed regions, and capable of improving the combustion state by positively generating the tumbles even in the low-intake operating regions.

In order to achieve the above object, the present invention provides an air intake system for internal combustion engines in which combustion air is led into a cylinder via an air inlet path, characterized in that: the air inlet path comprises a double structure of a main inlet path and a sub inlet path that the sub inlet path is placed in close contact with a bottom wall of the main inlet path, a downstream end of the sub inlet path being positioned near an inlet valve opening on its one side other than an exhaust valve opening side; and that an opening/closing valve is disposed within the sub inlet path, wherein the opening/closing valve is closed in a low intake-air amount operating region of the engine so as to allow intake air to be biased from the main inlet path toward a center of the cylinder and to flow into the cylinder along a cylinder axis.

DETAILED DESCRIPTION OF THE PREFERRED EMBODIMENTS

Hereinbelow, the air intake system for internal combustion engines according to the present invention is described with reference to the accompanying drawings.

Figure 1:
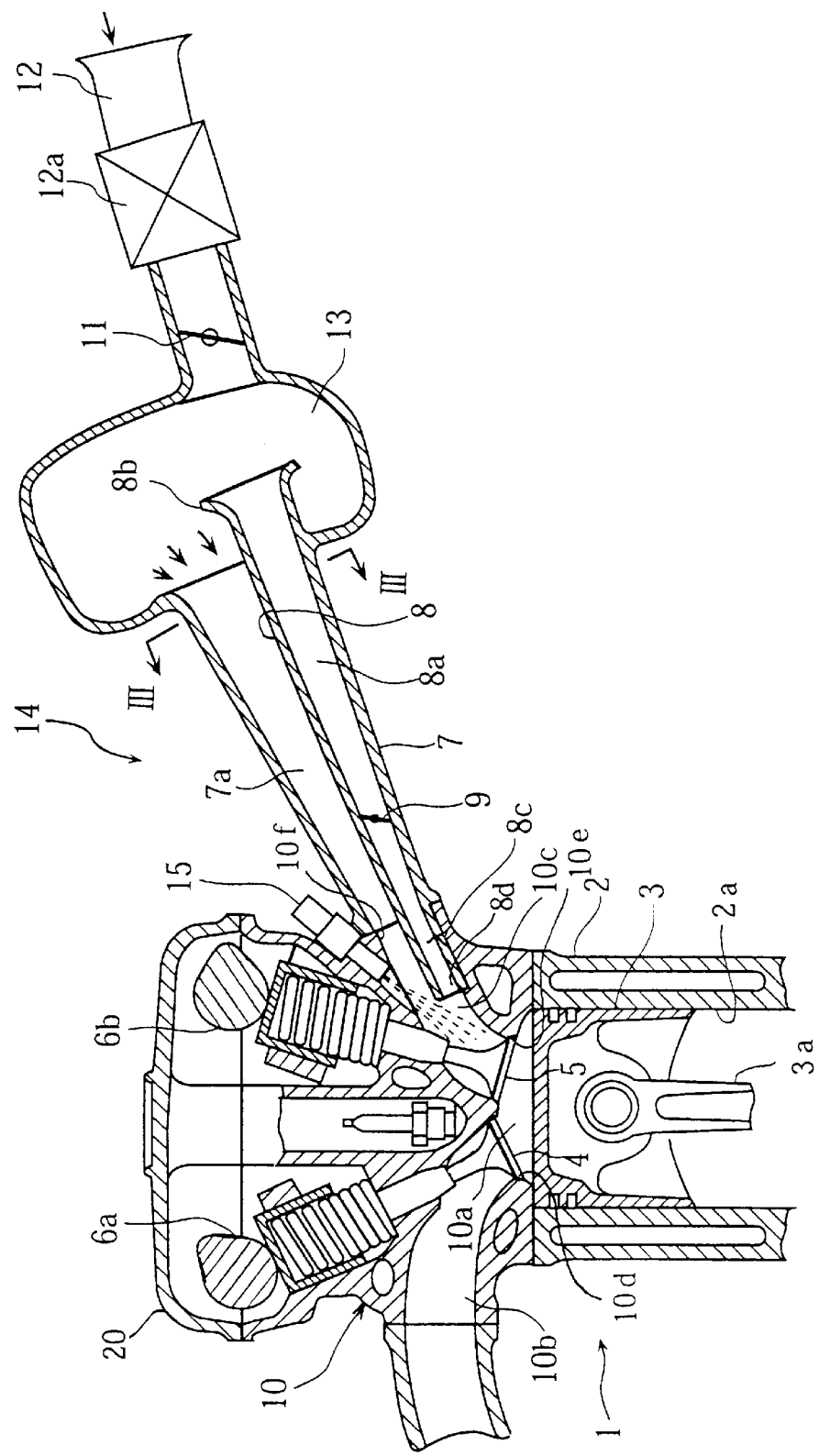
FIG. 1 is a cross-sectional side view of an air intake system for an engine according to an embodiment of the present invention.
Figure 2:
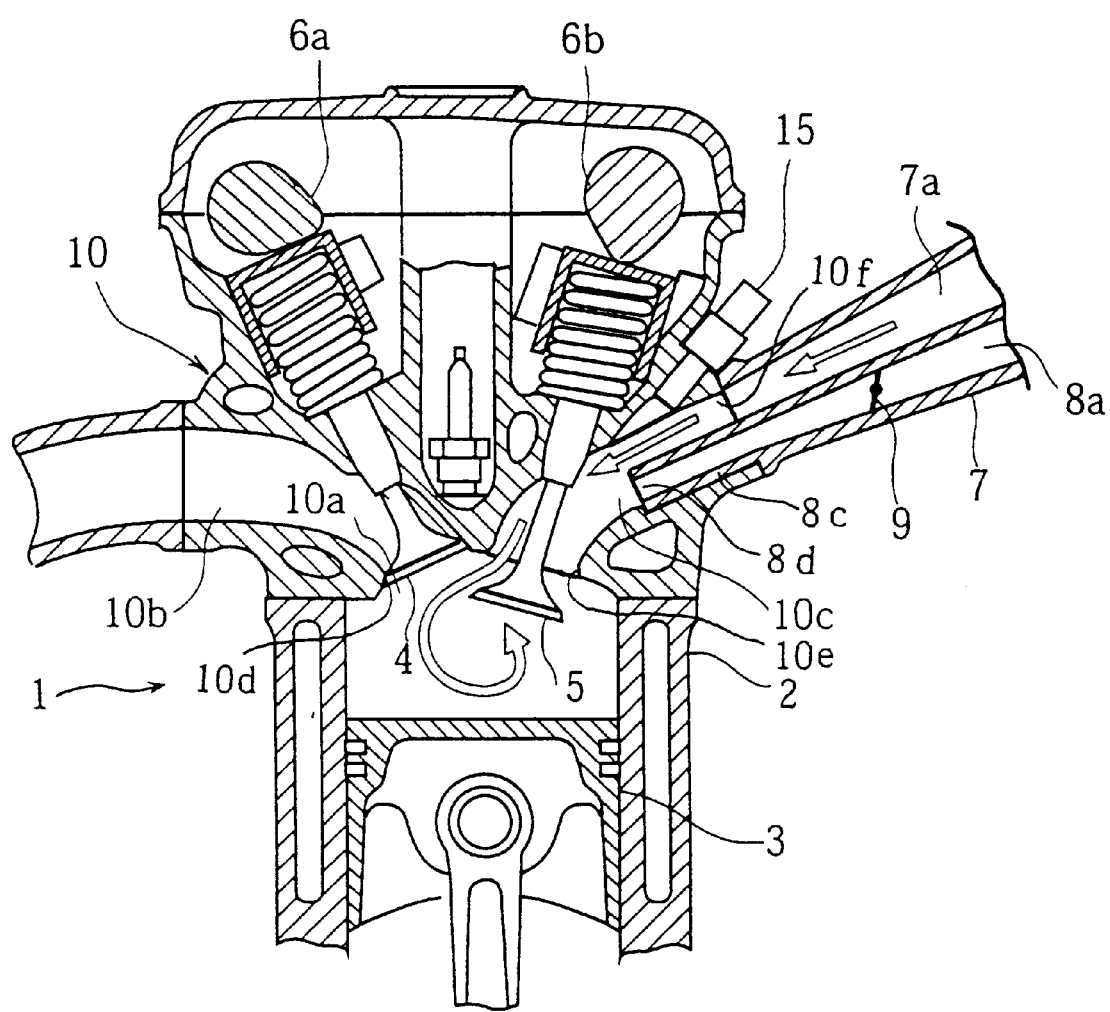
FIG. 2 is a cross-sectional side view of main part of the engine for explaining the function of the air intake system.
Figure 3:
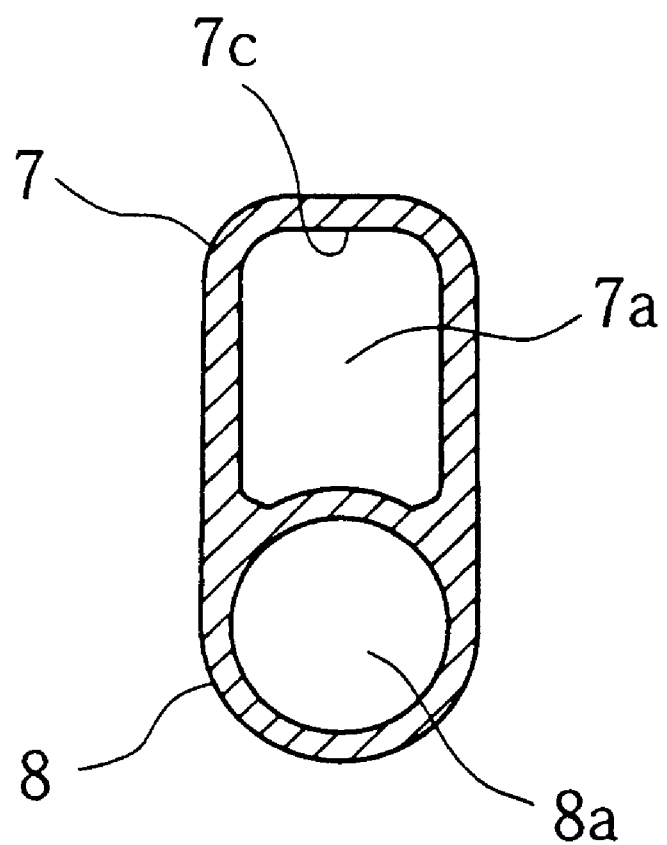
FIG. 3 is a cross-sectional view taken along the line III—III of FIG. 1.
Figure 4:
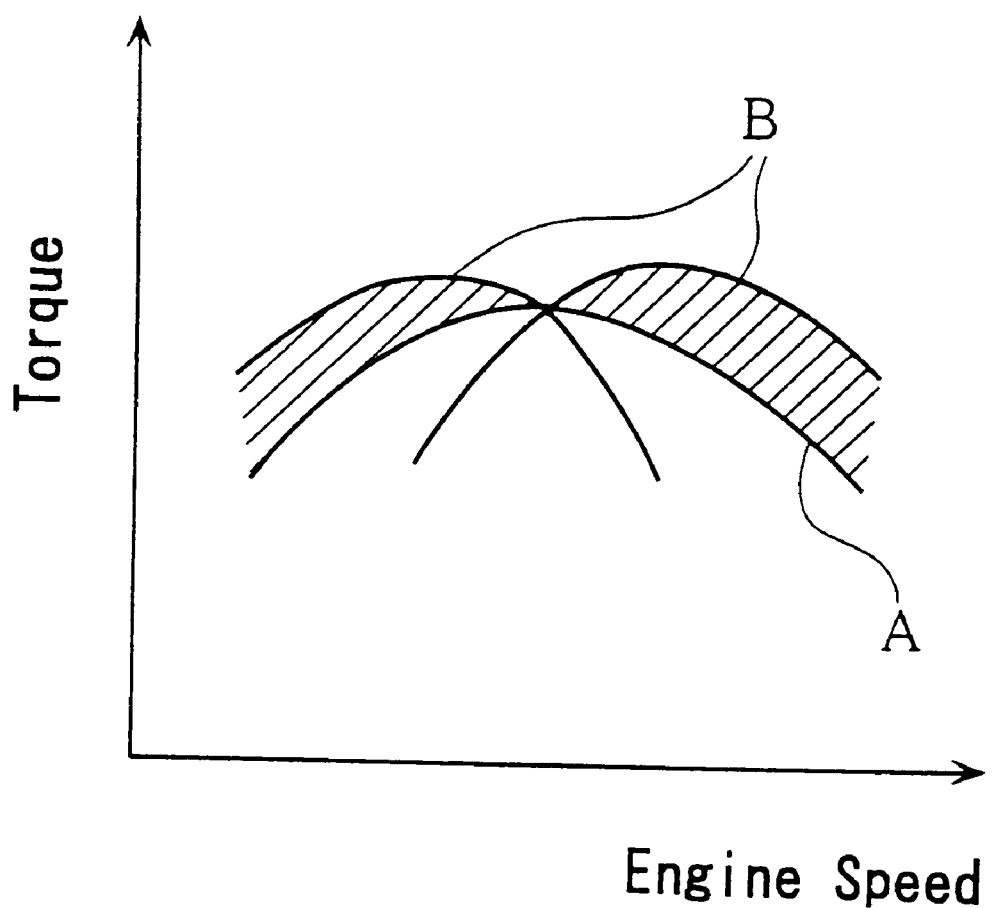
FIG. 4 is an engine speed versus torque characteristic view for explaining the effects of the air intake system.

FIGS. 1 through 4 are views for explaining the air intake system for a four-cycle engine according to an embodiment of the present invention. FIGS. 1 and 2 are cross-sectional side views of main part of an engine including the air intake system; FIG. 3 is a cross-sectional view taken along the line III—III of FIG. 1; and FIG. 4 is an engine speed versus torque characteristic view for explaining the effects of the air intake system.

Referring to the figures, reference numeral 1 denotes a water-cooled 4-cycle gasoline engine, which is generally so structured that a cylinder block 2 is integrally formed in a fore portion of an unshown crankcase, with a cylinder head 10 and a head cover 20 tightened and layered on the cylinder block 2. In a cylinder bore 2a formed in the cylinder block 2, a piston 3 is slidably inserted and further coupled to a crankshaft (not shown) via a connecting rod 3a.

Also, two exhaust valve openings 10d and two inlet valve openings 10e are opened in a combustion recess 10a recessed in a cylinder block side-abutment surfaces of the cylinder head 10. Each of the exhaust valve openings 10d is led to the front wall of the cylinder head 10 via an exhaust port 10b, while each of the inlet valve openings 10e is led to the rear wall of the cylinder head 10 via an inlet port 10c. Also, the exhaust valve opening 10d and the inlet valve opening 10e are opened and closed by an exhaust valve 4 and an inlet valve 5, respectively, and the exhaust valve 4 and the inlet valve 5 are driven to be opened and closed by an exhaust camshaft 6a and an inlet camshaft 6b, respectively.

Then, a main inlet pipe 7 of the air intake system 14 is connected to an external connection opening 10f of the inlet port 10c, where is formed an air inlet path for introducing outside air by the main inlet pipe 7 and the inlet port 10c into a space (combustion chamber) surrounded by the combustion recess 10a, the top face of the piston 3 and the cylinder bore 2a.

An air intake pipe 12 is connected to an upstream end of the main inlet pipe 7 via an air cleaner 12a. Also, an air chamber 13 is integrally formed midway of the main inlet pipe 7 in a swollen shape, and a throttle valve 11 is provided in the upstream of the chamber 13. Also, a fuel injection valve 15 is provided at the external connecting opening 10f portion of the cylinder head 10. The fuel injection valve 15 injects and feeds fuel toward vicinities of the rear face of an umbrella-like portion of the inlet valve 5.

A sub inlet pipe 8 is integrally formed in a portion of the main inlet pipe 7 more downstream than the air chamber 13. The sub inlet pipe 8 is disposed so as to be in close contact with the bottom wall of the main inlet pipe 7, i.e., to share the pipe wall, the place of its disposition being so structured that a main inlet path 7a and a sub inlet path 8a are stacked above and below as shown in FIG. 3. The main inlet path 7a is formed into a generally rectangular shape with its top wall surface 7c formed flat, while the sub inlet path 8a is formed into a circular shape in cross section, where the main inlet path 7a and the sub inlet path 8a has gradually lowering height toward the downstream side.

An upstream opening 8b of the sub inlet path 8a is opened into the air chamber 13. The downstream end of the sub inlet path 8a is extended so as to project more downstream than the main inlet path 7a, this extension 8c being inserted into the inlet port 10c. A downstream opening 8d of the extension 8c is positioned at a place near the inlet valve opening 10e on its one side other than the exhaust valve opening side.

An opening/closing valve 9 is disposed within the sub inlet path 8a. This opening/closing valve 9 is closed in low-intake operating regions of less intake air such as low engine-speed regions and low load operating regions, and opened in the other middle and higher intake operating regions, by an unshown opening/closing control mechanism.

Next, functional effects of this embodiment are described below.

In this air intake system 14, the cross-sectional area of the path is changed depending on the operating region of the engine by switching the inlet path to the main inlet path 7a only or to both the main and sub inlet paths 7a, 8a by means of the opening/closing valve 9.

First, in a low-intake operating region like a low-speed region, the opening/closing valve 9 is closed by the opening/closing control mechanism as shown in FIGS. 1 and 2. Then, air passes only through the main inlet path 7a, being sucked into the engine 1. In a high-intake operating region like a high-speed region, the opening/closing valve 9 is opened by the opening/closing control mechanism. Then, air passes through both the main inlet path 7a and the sub inlet path 8a, being sucked into the cylinder bore.

As shown above, in this embodiment, since the cross-sectional area of the air inlet path is switched over between low engine speed and high engine speed, the cross-sectional area is given in two ways in the aforementioned equation. Accordingly, as shown in FIG. 4, the torque curve B of this embodiment shows increased torques in low and high two-level engine speed regions, so that the torque can be enhanced over a wider range, in contrast to the torque curve A of a conventional engine.

In this embodiment also, since the switching of the cross-sectional area of the air inlet path is implemented with a double-layer structure of the main and sub inlet paths 7a, 8a, the installation space can be reduced as compared with the conventional case of parallel arrangement.

In this embodiment, the sub inlet path 8a is placed so as to be laid on the bottom side of the main inlet path 7a, while the extension 8c of the sub inlet path 8a is inserted into the inlet port 10c with its downstream opening 8d being positioned on one side of the inlet valve opening 10e other than the exhaust valve opening side, i.e., on the outer peripheral edge side of the combustion recess 10a. Therefore, when the sub inlet path 8a is closed by the opening/closing valve 9, intake air passes through the main inlet path 7a so as to be biased toward the cylinder bore center and sucked into the cylinder bore axially of the cylinder bore, so that tumbles can be positively generated even in the low-intake operating regions (see FIG. 2). In this case, the top wall portion of the inlet port 10c is formed flat like the top wall surface 7c of the main inlet path 7a shown in FIG. 3. Therefore, the tumbles can be positively generated from this point of view, so that the combustion state can be improved.

Figure 5:
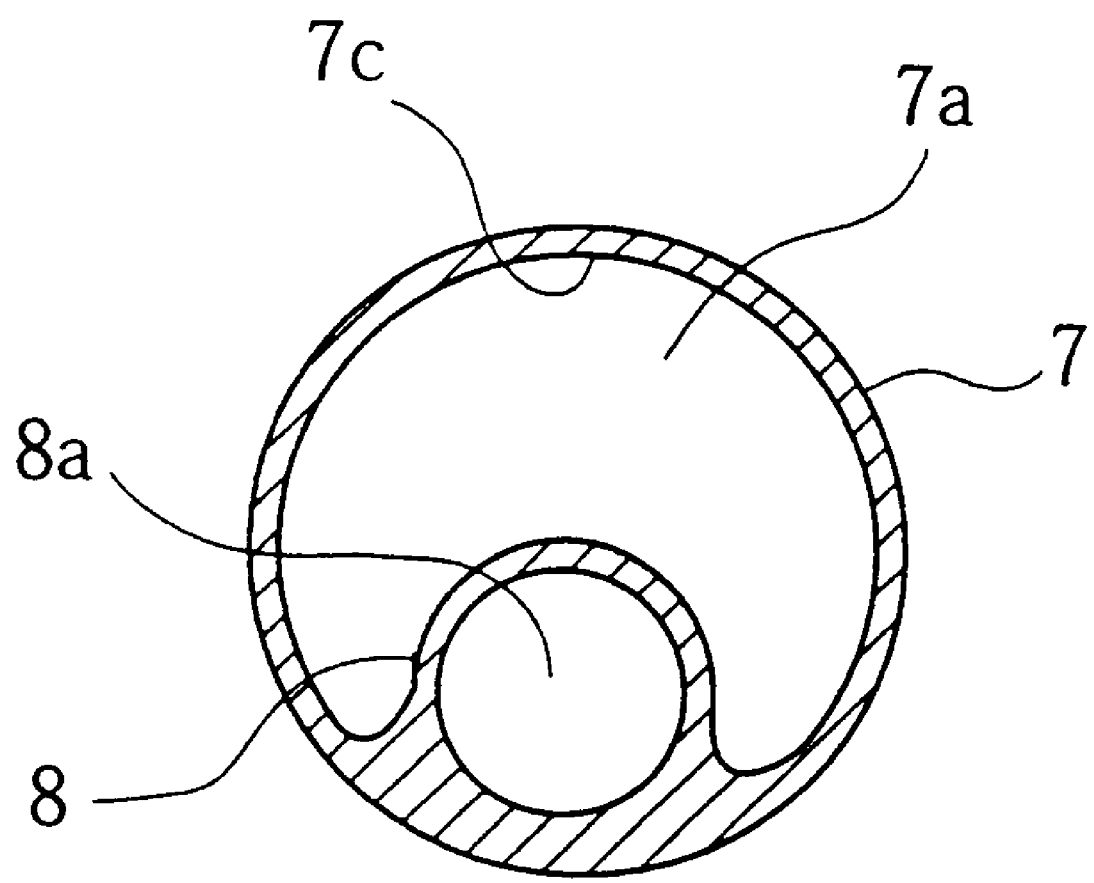
FIG. 5 is a cross-sectional view showing a modification example of the inlet pipe of the air intake system.

In addition, the main, sub air inlet paths may be formed in cross section also as shown in FIG. 5. In the example of FIG. 5, the whole inlet pipe is formed circular, where a circular sub inlet pipe 8 is integrally formed in close contact with the bottom wall of the main inlet pipe 7.

Figure 6:
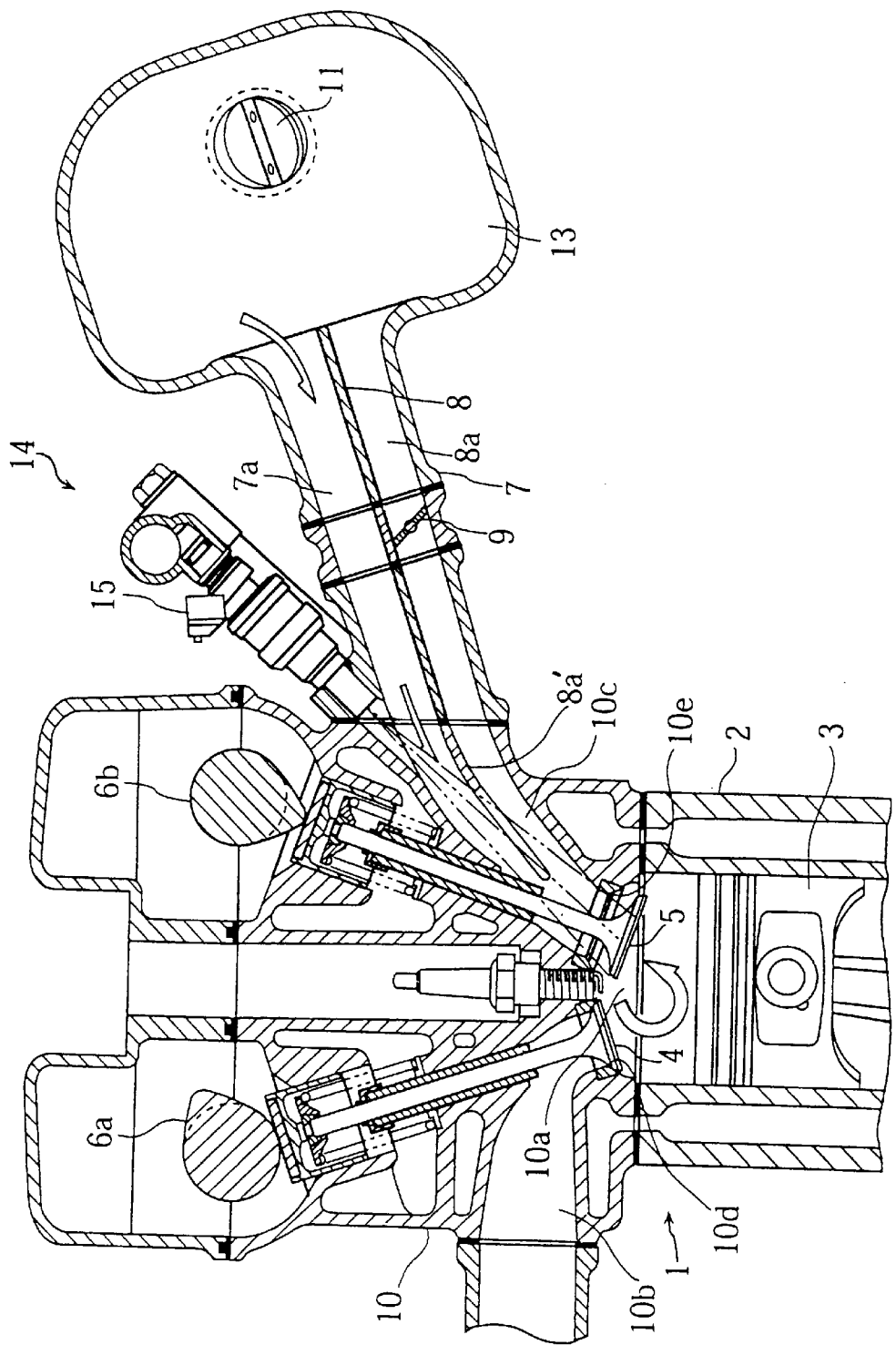
FIG. 6 is a cross-sectional side view showing a modification example of a portion of the sub inlet path near the opening of the inlet valve.

In this embodiment also, the extension 8c that is an extension of the downstream end of the sub inlet path 8a is inserted into the inlet port 10c. However, as shown in FIG. 6, a sub inlet path 8a' may alternatively be formed integrally with the bottom portion of the inlet port 10c of the cylinder head 10, where the downstream end of the sub inlet path 8a' is positioned at a place near the inlet valve openings 10e on its one side other than the exhaust valve opening side.

As described above, according to the air intake system for internal combustion engines of the present invention, the air inlet path is provided in a double structure comprising main and sub inlet paths, and the sub inlet path is closed by the opening/closing valve in low-intake operating regions. Therefore, the cross-sectional area of the inlet path can be switched over, so that the amount of intake air can be increased over a wider range of engine speed regions, enabling an improvement in torque. Also, the double structure produces an effect of allowing a great reduction in installation space, as compared with the conventional structure of parallel arrangement.

Also, since the downstream end portion of the sub inlet path is positioned at a place near the inlet valve opening on its one side other than the exhaust valve opening side. Therefore, when the sub inlet path is closed, the downstream end portion of the sub inlet path serves as a guide that allows intake air to be biased toward the cylinder center and flow into the cylinder along the cylinder axis. Thus, tumbles can be generated reliably even in low-intake operating regions with a simple construction, so that the combustion state can be improved as a further effect.

What is claimed is:

1. An air intake system for internal combustion engines in which combustion air is led into a cylinder via an air inlet path, comprising:

a main inlet path configured to engage an inlet port formed in a cylinder head of an internal combustion engine;

a sub inlet path placed in close contact with a bottom wall of the main inlet path, a downstream end of the sub inlet path being positioned near an inlet valve opening of the air inlet path and on a side of said inlet valve opening, said sub inlet path extending through said inlet port such that a discharge end of said sub inlet path is positioned down stream of said inlet port, along a direction of airflow into the internal combustion engine; and a sub inlet valve disposed within the sub inlet path, wherein said sub inlet valve is closed in a low intake-air amount operating region of the engine so as to allow intake air to be biased from the main inlet path toward a center of the cylinder and to flow into the cylinder along a cylinder axis.

2. The air intake system of according to claim 1, wherein said discharge end of said sub inlet path is positioned downstream of a fuel injector valve of the internal combustion engine, along said direction of airflow.

3. An air intake system according to claim 1, wherein said main inlet path has a cross section that is greater than a cross section of said sub inlet path.

4. An air intake system according to claim 2, wherein said main inlet path has a cross section that is greater than a cross section of said sub inlet path.

5. An air intake system according to claim 1, wherein the exhaust valve opening is provided in communication with the cylinder, at a position substantially opposite the intake valve opening.

6. An air intake system according to claim 1, wherein the downstream end of the sub inlet path is positioned on a side of the intake valve substantially opposite from the exhaust valve.

* * * * *